United States Patent [19]

Smith et al.

[11] Patent Number: 5,542,120
[45] Date of Patent: Jul. 30, 1996

[54] METHOD FOR MONITORING A COMMUNICATION SYSTEM

[75] Inventors: Anthony J. Smith, Langford; Peter J. Myers, Letchworth Garden City, both of England

[73] Assignee: Smith Myers Communications Limited, England

[21] Appl. No.: 39,313

[22] PCT Filed: Oct. 15, 1991

[86] PCT No.: PCT/GB91/01795

§ 371 Date: Jun. 9, 1993

§ 102(e) Date: Jun. 9, 1993

[87] PCT Pub. No.: WO92/07429

PCT Pub. Date: Apr. 30, 1992

[30] Foreign Application Priority Data

Oct. 15, 1990 [GB] United Kingdom ............ 9022347

[51] Int. Cl.⁶ .................................. H04B 17/00
[52] U.S. Cl. .............. 455/54.1; 455/33.1; 455/67.1; 379/59
[58] Field of Search .............. 455/33.1, 33.2, 455/54.1, 53.1, 56.1, 67.1, 68, 67.3, 8, 9; 379/58, 59; 371/7

[56] References Cited

U.S. PATENT DOCUMENTS

| | | | |
|---|---|---|---|
| 4,305,150 | 12/1981 | Richmond et al. | 455/67.3 |
| 4,415,770 | 11/1983 | Kai et al. | 455/67.3 |
| 4,903,321 | 2/1990 | Hall et al. | 455/67.3 |

OTHER PUBLICATIONS

Kerr, Douglas, "Cellular Telephone Technology and Practice", pp. 2-2, 2-5, 3-8, 3-10 and 3-16, cpy 1986.

Lee, William, Mobile Cellular Telecommunications Systems, 1989, pp. 8, 73, 76-77.

*Primary Examiner*—Reinhard J. Eisenzopf
*Assistant Examiner*—Doris To
*Attorney, Agent, or Firm*—Barnes & Thornburg

[57] ABSTRACT

A method is provided for monitoring operational performance of a communication system including a mobile telephone unit and a plurality of control stations, while the mobile telephone unit is in operation within the communication system. The method makes use of signals passing between the mobile telephone unit and one of the plurality of control stations during such operation. The method including the steps of establishing an identity of the mobile telephone unit from said signals and utilizing predetermined operational characteristics of the signals as a source of information for monitoring operation of the mobile telephone unit. Therefore, the method can detect automatically a faulty mobile telephone unit or control station during operation of the mobile telephone unit.

13 Claims, 2 Drawing Sheets

METHOD FOR MONITORING A COMMUNICATION SYSTEM

BACKGROUND OF THE INVENTION

This invention is concerned with monitoring electronic systems.

In particular, but not exclusively, the present invention is concerned with equipment for facilitating the diagnostic testing/monitoring of mobile telephone units or more generally mobile transmitter/receiver units.

A particular form of such mobile communication system is known as a cellular mobile communications system.

For convenience and without limitation of the scope of the practical application of the methods and apparatus of the invention, for the purposes of facilitating discussion of such methods and apparatus of the invention, the use thereof in relation to a cellular mobile communication system will be considered in detail.

In brief, a cellular mobile communication system is a communication network involving a number of so-called cells which makes it possible for a transmitter/receiver unit installed in a motor or other vehicle, to communicate with conventionally provided telecommunications systems by way of a network of transmitter/receiver aerials or beacons each defining the 'focal point' or node of a cell and each of which are so positioned in predetermined locations relative to each other across the zone or region within which the network is designed to be operative, as effectively to form inter-related groups of cells.

In a known system, each cell group includes seven individual cells whose arrangement within a group can be likened to a honeycomb. In this system the groups themselves are mutually arranged within the system so as to expand the extent of operation of the group honeycomb.

Each cell includes a beacon which is responsive to a predetermined number of channels selected from the total number of channels (amounting to several hundred) involved in the overall system. In addition, each such cell of a group has uniquely ascribed thereto a particular group of the channels whereby no two adjacent cells in the overall system have precisely the same channel grouping.

The underlying concept is that when a mobile transmitter/receiver unit is located within the effective area of any one beacon and the user thereof requires to communicate with a particular telephone number, national or otherwise, the mobile equipment enables him to dial, in a manner similar to the dialling of a conventional telephone the required number. The mobile equipment is capable of opening a communication channel to the required telephone subscriber by way of the beacon in the cell within which the vehicle happens to be located at the time of initiating operation of the equipment.

As the vehicle with the mobile unit moves further away from any one beacon and moves nearer to any other beacon in the system, the system itself, where necessary, automatically transfers the communication path from beacon to beacon.

Control arrangements provided within the beacon network of the system, and those involved in the mobile equipment ensures that any communication link that has been established is maintained as the vehicle moves from the ambit of one beacon to that of the next beacon along the route of the vehicle. Thus the mobile unit is automatically effectively transferred from one beacon to another without any interference with (i.e., breaking the communication connection established) the communication path between the mobile unit and the called number. These operations are effected without any action by the user.

From the forgoing it will be appreciated that the equipment involved is highly complex, and that having regard to this complexity it has been found that it is essential that the actual mobile units involved should always operate within their operational specifications to ensure the optimum operational efficiency of the system overall.

It will also be appreciated that since the communication system involves provision of a very large number of relatively narrow (frequency-wise) communication channels between the mobile telephone units and the network of so-called base channels it is important that any mobile telephone unit should always operate within the frequency limits of any channel to which it is allocated so as to avoid any operational interference between channels.

In practice, if the operational parameters of any mobile telephone unit should drift in such manner that the operational bandwidth thereof overlaps the frequency limits of adjacent channels any mobile telephone unit allotted to these adjacent channels may well be prevented from efficient operation.

A further problem arises in that the operation of a telephone unit whose operational frequency has spread i.e., whose frequency response has drifted, outside the allowed band width of a channel, can adversely affect the transfer of telephone communication paths from node to node.

With regard to this known equipment, experience has shown that it is not until the user of the telephone notices, normally during actual use of the equipment, that the performance of the mobile telephone is not as good as expected or as previously experienced does the user consider taking corrective action to have the mobile telephone equipment involved tested and, if necessary, repaired.

It will be apparent that by the time the actual user has realized that the equipment has become defective there is every possibility that progressive ongoing malfunctioning equipment could have reached the stage in which it is and may have been for a considerable period of time seriously adversely interacting with the equipment of other users, and thereby reducing the efficiency of operation of such other user's equipment and also the operation of the system overall.

OBJECTS OF THE INVENTION

It is an object of the present invention to provide methods and/or apparatus which facilitates the efficient effective operation of mobile telephone systems.

STATEMENTS OF THE INVENTION

Broadly, according to the invention there is provided a method of uniquely identifying any mobile telephone unit in operation within a communications system involving a plurality of control locations/nodes/beacons/base stations or the like, whilst the mobile unit is in operation within the communication system by making use of signals passing between a mobile telephone unit and any operationally convenient control location/node/beacon/base station or the like during such operation.

Also according to the present invention there is provided a method of monitoring/measuring the operational performance of any mobile telephone unit in operation within a communications system involving a plurality of control locations/nodes/beacons/base stations, whilst the mobile unit is in operation within the communication system by making use of signals passing between a mobile telephone unit and any control location/node/beacon/base station during such operation, characterized by the steps of establishing the identity of the mobile station from said signals and utilizing predetermined operational characteristics of the signals as a source of information for said monitoring/measuring.

Preferably, the signals utilized for such identification are predetermined parameters of radio frequency signals involved in the communication system.

Conveniently, the unique identification of a mobile unit is established during the initial stages of the establishment of a communication path between the mobile unit and the remainder of the system.

Preferably, the unique identification of a mobile unit comprises detection of the mobile identity number of the mobile unit and the number of the channel within which it is operational at the time of the identification.

Conveniently, following such identification predetermined operation characteristics/parameters of the mobile unit are monitored and the results of such monitoring are utilized for presenting/recording the values of the characteristics/parameters monitored.

In accordance with a further aspect of the invention the operational performance of apparatus for establishing communication paths for a mobile unit within a communication system involving a plurality of control locations/nodes/beacons/base stations or the like with which the mobile units are arranged operationally to be able to communicate is monitored whilst communication paths between mobile units and the system are in operation.

Broadly, according to a still further aspect of the invention there is provided apparatus for enabling any mobile telephone unit arranged for operation with a communications system involving a plurality of control locations/nodes/beacons /base stations or the like; to be uniquely identifiable from any such control location/node/beacon/base station or the like whilst the mobile unit is in operation within the communication system.

Conveniently, the control signals transmitted from the control location/node/beacon/base station or the like are utilized for affecting said unique identification.

Preferably, arrangements are provided for enabling at least one predetermined operational characteristic/parameter of a mobile telephone unit arranged for operation with the communications system, to be remotely monitored/checked whilst the mobile unit is operation within the communication system.

Broadly, according to another aspect of the invention there is provided apparatus for which can be configured for monitoring the performance characteristics of the signal transmitting/receiving equipment of a base station of a cellular communications system and/or the performance characteristics of any mobile unit from time to time utilized the base station in the establishment of a channel communication path, the arrangement being such as to enable, for the base station and/or for a mobile unit, predetermined operational characteristics/parameters to be monitored during the operation thereof within the communication system.

In accordance with a preferred aspect of the invention there is provided apparatus for decoding the control information transmitted between a base station and a mobile unit in such manner that whilst a communication path is established between the control/base station and a mobile unit predetermined ones of the operational parameters of the mobile unit can be measured/monitored whilst the mobile unit is in operation.

Preferably, the apparatus of the invention incorporates means for decoding the channel selection control information transmitted, by a control/base station to a mobile unit requiring to establish a telephone connection with another number, to the calling mobile unit to specify the channel to be used and means for automatically recording the mobile identity number or the like of the calling mobile unit, for performing a predetermined sequence of measurements of the operational parameters of the mobile unit and for recording any measurements made.

In a further arrangement the signal emanating from the mobile unit is utilized for the purposes of the present invention.

In a particular embodiment the apparatus of the invention is arranged to monitor/measure inter alia the following operational parameters:

carrier frequency error;
supervisory audio tone frequency;
Supervisory audio tone deviation;
signalling tone frequency;
signalling tone deviation;
peak voice deviation; and
input power received from the mobile unit.

It will be understood that the apparatus and methods of the invention are not limited to the above specifically mentioned parameters.

The data derived from such measurement is conveniently stored by suitable computer arrangements and is arranged to be presentable in the form of a composite computer 'printout'.

BRIEF DESCRIPTION OF THE DRAWINGS

For a better understanding of the invention and to show how to carry the same into effect reference will now be made to the accompanying drawings in which.

DESCRIPTION OF THE PREFERRED EMBODIMENTS

Figure 1:
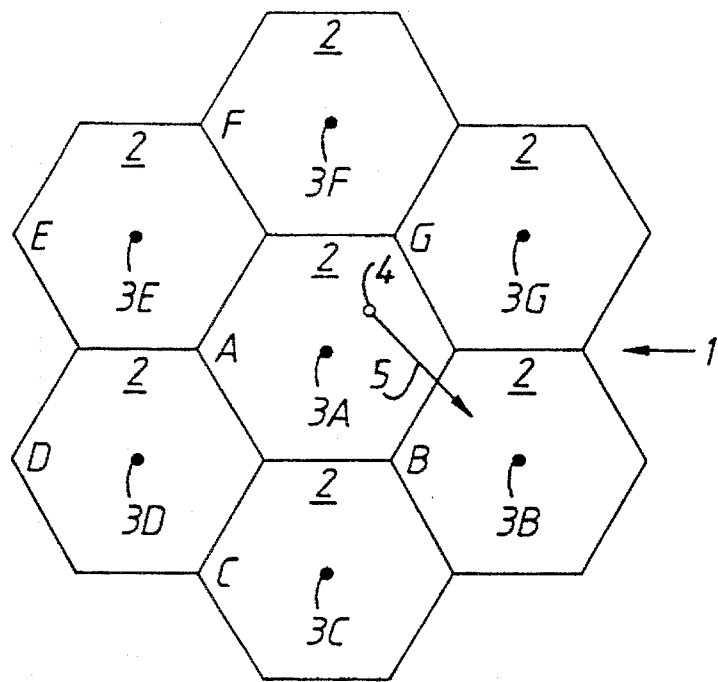
FIG. 1 very schematically represents a group of adjacent cells in a cellular communication system illustrating the manner in which the cellular network is functionally arranged.

Referring now to FIG. 1 of the drawings this Figure illustrates in schematic outline the effective area of operation of a group 1 of seven cells 2 of a cellular communication system. For convenience, the cells have been identified by the letters A.B.C.D.E.F, and G. Each cell includes a beacon 3. For convenience also, the beacons 3 have been individually identified by the letters A.B.C.D.E.F, and G with the beacon A being located centrally of the other beacons B through G. Each beacon 3 is capable of operating with a unique plurality of communications channels selected from the total number of channels involved in the cellular system. Each such communication channel occupies a precisely defined frequency band width within the overall system.

As so far described a mobile unit 4 when located, for example, in the operational zone of beacon A is able to communicate with a required telephone number by a communication link involving the beacon A. As the vehicle moves from cell A, for example, to cell B along a route indicated by the line 5 the cellular network is such the communication path portion formed by the beacon A is transferred to the beacon of cell B.

This is effected without the user of the mobile unit being aware of the beacon transfer.

It will be understood that the complex electronic equipment within the mobile unit will be executing channel seeking operations amongst the beacons involved and likely to be involved with a view to ensuring that the necessary transfer between adjacent beacons takes place as and when required. In practice, such transfers could well involve a number of interchanges of communication path between beacons whilst maintaining the user's telephone communication path. In practice, to achieve the inherent electronic operations taking place, the mobile unit needs to be able to respond to any instantaneous relevant input control and data signals, and also to be able effectively to produce the appropriate response signals to maintain and ensure correct operation. In view of these requirements it is, as mentioned above, very important that the operational parameters of any mobile unit utilizing the cellular system of FIG. 1 should satisfy the operational standards specified for the system.

The apparatus of the invention incorporates at least one input signal aerial arrangement which depending upon the configuration of the system, i.e., base station performance monitoring or mobile unit monitoring, either utilizes the so-called 'off air' signal namely the base station transmitted RF signal or the forward control channel for a voice channel assignment.

Figure 2:
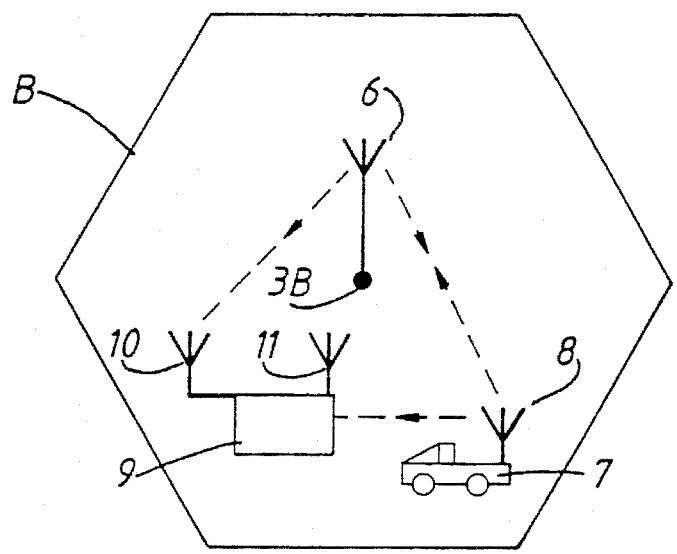
FIG. 2 very schematically illustrates the system of the present invention.

Referring now to FIG. 2 which very schematically illustrates in outline one of the cells, for example cell B, of FIG. 1 to a greatly enlarged scale. This cell incorporates the base station 3B having a transmit/receive aerial arrangement shown at 6. A mobile telephone unit 4 is represented by a symbolic vehicle 7 having an associated transmit/receive aerial 8.

Also located at the base station is the Cellular System Monitoring apparatus 9 in accordance with the proposals of the invention. This apparatus 9 incorporates an arrangement 10 (this can conveniently be regarded as being similar to an aerial even though a direct cable connection could be utilized) for receiving radio frequency signals being transmitted by the base station 3B to mobile units 4 which latter are at any one time located within the operational ambit of the cell in question.

The apparatus 9 incorporates a second aerial 11 arranged for receiving signals being transmitted by any mobile unit located within the operational ambit of the cell 3B.

It will be appreciated that the telephone unit of the mobile unit will of necessity be capable of both transmitting and receiving the carrier radio frequency signals of the communication system together with digital data streams carrying the telephone messages between users of the communication system.

In one form of use of the apparatus of the invention, when ever a particular mobile unit is being called i.e, paged by the base station so as to establish a telephone link with the mobile unit the base station in simple terms checks that the mobile unit is located within its region of operation and then allocates a channel, out of the plurality of channels dedicated to the cell involved, in which the telephone link is to be made to the mobile unit that has been called.

The apparatus of the invention makes use of these signals in this first mode of use to 'read' the mobile identity number and also the channel within which the subsequent telephone link will be made as illustrated at blocks 12 and 14 in FIG. 3.

Following this, once the mobile unit has responded i.e., the telephone link has been made, and the mobile unit commences to transmit/receive, the signals being emitted/received by the mobile unit are detected by the aerial 10 as illustrated at block 16.

The apparatus 9 incorporates signal decoding arrangements able to decode from the transmitted signals predetermined characteristics/parameters associated with the operational specification of the mobile telephone unit as illustrated at block 18.

Thus the apparatus 9 is able to respond to the signals transmitted by a mobile unit when it is the latter initiating the telephonic operation. In other words in this particular mode the requisite monitoring is effected by using the signal link between the base station and the mobile unit without necessarily involving signals direct from the base station.

It will be appreciated that the construction and operation of signal decoders as electronic units are both so well known that a detailed discussion of the construction and operation of such decoders is not required.

Similarly, apparatus for measuring, recording, storing and presenting information derivable from electric signals and digital data streams are likewise individually well known so that a detailed discussion is not thought necessary.

Figure 3:
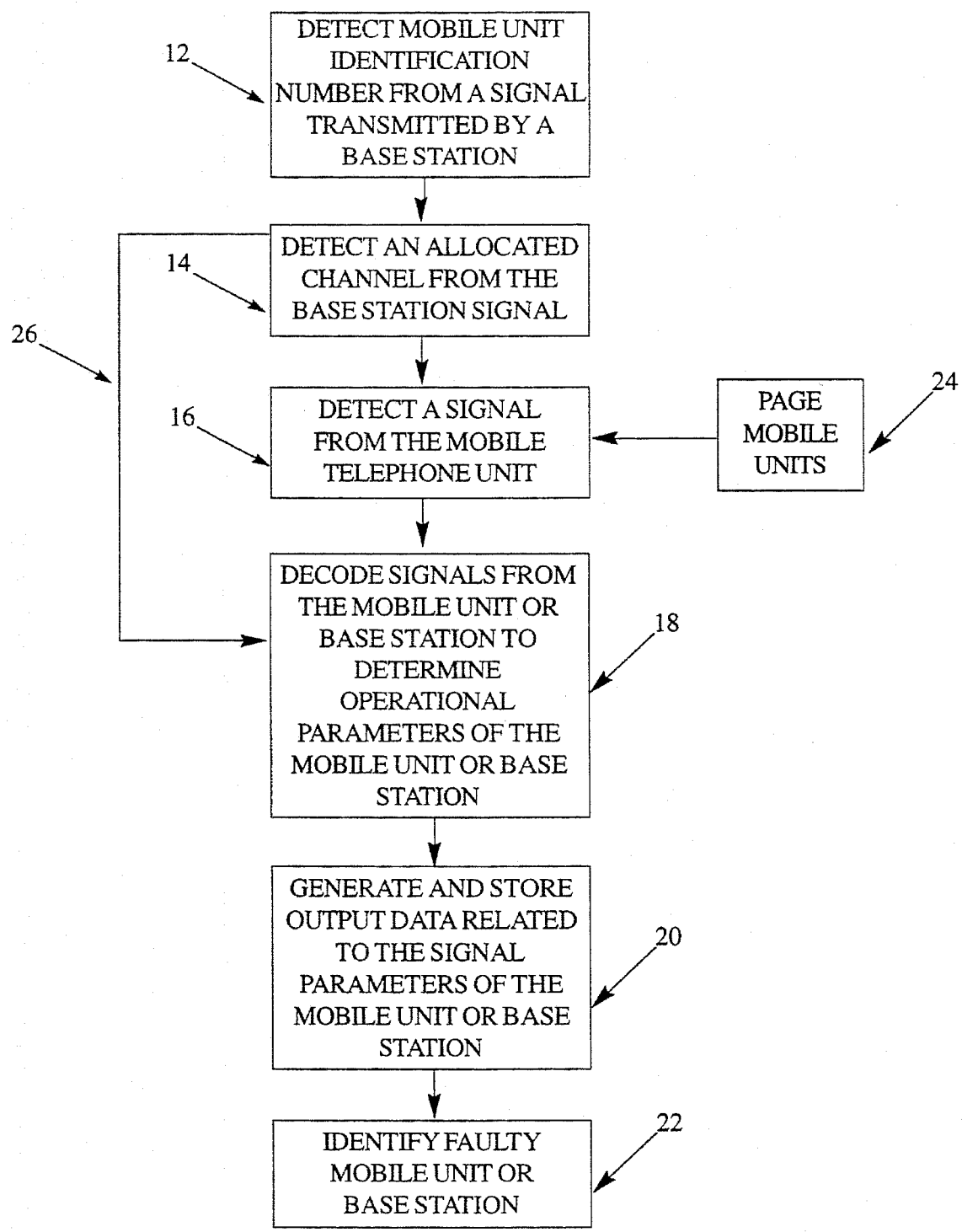
FIG. 3 is a flow chart illustrating the monitoring steps performed by the apparatus of the present invention.

The various decoder signals/data streams are conveniently processed by computer arrangements so as to produce a tabulated/graphical output illustrating the operational state of the mobile unit being monitored as illustrated at block 20 in FIG. 3.

It will be appreciated that the apparatus of the invention enables identification of faulty mobile units thereby making it possible for any such faulty units to be rapidly identified thereby making it readily possible for such units to be repaired as illustrated at block 22 in FIG. 3.

In a further mode of use of the apparatus of the invention, conveniently at low level use periods of the communications system, the base station can successively page the mobile units as illustrated at block 24 whereupon the apparatus of the invention is utilized to monitor the paged mobile units so as to effect routine checks of the operational specifications of the units and thereby provide regular identifications of any faulty mobile telephone units within the operational ambit of the beacon.

In a further utilization of the apparatus of the invention the output and other operational parameters of the base stations thought convenient can be monitored to identify faulty operating base stations as illustrated by line 26.

It is not essential for the apparatus of the present invention to be located at a location of a beacon. In fact, the apparatus of the invention can be sited at any convenient position, provided of course the aerials/antennas thereof are able to pick-up the signals from the beacon.

As mentioned, the apparatus of the invention can have one or the other of two operational configurations.

A first of such configurations is the use thereof to monitor the performance of the base station. For this configuration when used with a cellular communication system it has been found convenient to use 'off air' input via the aerial 10.

The apparatus is provided with decoders suitable for enabling measurement of TX carrier Error; Supervisory Audio Tone Frequency and Deviation, Peak Voice and Power Levels. In practice, the power measurements are intended to be used with respect to a recorded level measured on the apparatus of the invention when installed at a base station site. When used in such configuration the apparatus of the invention makes it readily possible to monitor and identify faulty base stations.

Furthermore, the apparatus of the invention can be arranged to monitor and record transmitted data streams in addition to the already mentioned Radio Frequency parameters.

The second usage configuration is the monitoring of the mobile units. For this purpose the unit incorporates a plurality of the aerials 10. The apparatus of the invention is able to monitor the Forward Control Channel for a voice channel assignment, from which it records the Mobile Identity Number, Assigned Voice Channel; Mobile Attenuation Code and the Supervisory Audio Tone Colour Code. After which the apperatus of the invention scans the aerials 10 for a response on the Assigned Voice Channel from the mobile. If this mobile has been paged (as above discussed) then the mobile will respond with the signalling tone. The apparatus of the invention measures both the frequency and deviation of this tone. On every occasion, whether a mobile unit is paged or calls, the apparatus of the invention will measure the returned supervisory audio tone frequency and deviation, carrier frequency error, and peak voice deviation. An RSSI reading is also recorded along with an indication of which aerial 11 was involved.

The apparatus of the invention can also be used to extract the ESN of the monitored mobile by monitoring the reverse control channel by way of the aerials 11.

In a particular situation, assuming that the mobile unit user dials a telephone number the mobile unit call signal is detected by the most convenient beacon (usually the nearest) and the telephone number being called i.e., another mobile unit number or conventional telephone number is passed by the beacon onto the appropriate called number via the conventional telephone network. Once the called number has responded i.e., via the conventional telephone network the beacon involved allots a convenient voice communication channel to the mobile unit involved. Once the voice channel has been allotted the called number response is passed via the selected voice channel to the mobile unit involved. The apparatus of the invention is such as be able to respond to the allotment of the voice channel and since the beacon provides, as has been mentioned control information which inter alia identifies the channel and also the mobile unit involved the mobile unit is readily identified for the purposes of the present invention. In practice, these control signals are in the form of digital signals which can be decoded by any convenient decoder apparatus. A similar routing procedure arises when the mobile unit is called.

We claim:

1. A method of monitoring operational performance of a mobile telephone unit in operation within a communications system involving a plurality of control stations by detecting signals passing between the mobile telephone unit and a particular control station during such operation, the method including the steps of establishing an identity of the mobile telephone unit from said detected signals and utilizing predetermined operational parameters of the detected signals as a source of information for monitoring operational performance of the communications system to identify a faulty mobile telephone unit automatically during normal operation of the mobile telephone unit and control station.

2. The method as claimed in claim 1, wherein the signals used are radio signals.

3. The method as claimed in claim 1, wherein identification of the mobile telephone unit is established during initial stages of the establishment of a communication path between the mobile telephone unit and the particular control station of the communications system.

4. The method as claimed in claim 1, further comprising the step of recording values of parameters monitored.

5. The method as claimed in claim 1, further comprising the steps of successively paging the mobile telephone unit from a control station of the communications system, and monitoring the mobile telephone unit to effect routine checks of operational specifications of the mobile telephone unit, thereby providing regular identifications upon detection of a faulty mobile telephone unit.

6. The method as claimed in claim 1, and including the step of detecting for the mobile telephone unit being monitored a mobile identity number of the mobile telephone unit and a number of the channel to which the mobile telephone unit has been directed to establish a communication path.

7. A method of automatically monitoring operational performance of a mobile telephone unit while the mobile telephone unit is in operation within a communications system including a plurality of base stations, the method comprising the steps of:

detecting a first signal transmitted by the mobile telephone unit to a particular base station;

determining an identification number of the mobile telephone unit from the first signal;

detecting a second signal transmitted by the mobile telephone unit to the particular base station during normal operation of the mobile telephone unit;

decoding the second signal to determine an actual operational parameter of the second signal from the mobile telephone unit; and monitoring the actual operational parameter of the second signal to identify a faulty mobile telephone unit during normal operation of the mobile telephone unit.

8. The method of claim 7, wherein the second signal is a radio frequency signal.

9. The method of claim 7, wherein the step of determining the identification number of the mobile telephone unit occurs automatically during an initial stage of the establishment of a communication path between the mobile telephone unit and the particular base station of the communications system.

10. The method of claim 9, wherein the second detecting step and the decoding step take place during normal operation of the mobile telephone unit.

11. The method of claim 7, further comprising the step of recording values of the actual operational parameter of the second signal decoded during the decoding step.

12. The method of claim 7, further comprising the steps of successively paging the mobile telephone unit from a base station of the communications system to effect routine checks of the operational parameter of the mobile telephone unit, and identifying a faulty mobile telephone unit.

13. A method of automatically monitoring operational performance of a mobile telephone unit while the mobile telephone unit is in operation within a communications system including a plurality of base stations, the method comprising the steps of:

detecting a signal from the base station, determining an identification number of the mobile unit from the signal detected from the base station, determining an allocated channel for the mobile telephone unit from the base station signal, detecting a signal transmitted by the mobile telephone unit to the base station on the allocated channel during normal operation of the mobile telephone unit, decoding the signal from the mobile telephone unit to determine an actual operational parameter of the signal from the mobile telephone unit, and monitoring the actual operational parameter of the signal to identify a faulty mobile telephone unit during normal operation of the mobile telephone unit.

* * * * *